Figure 1:
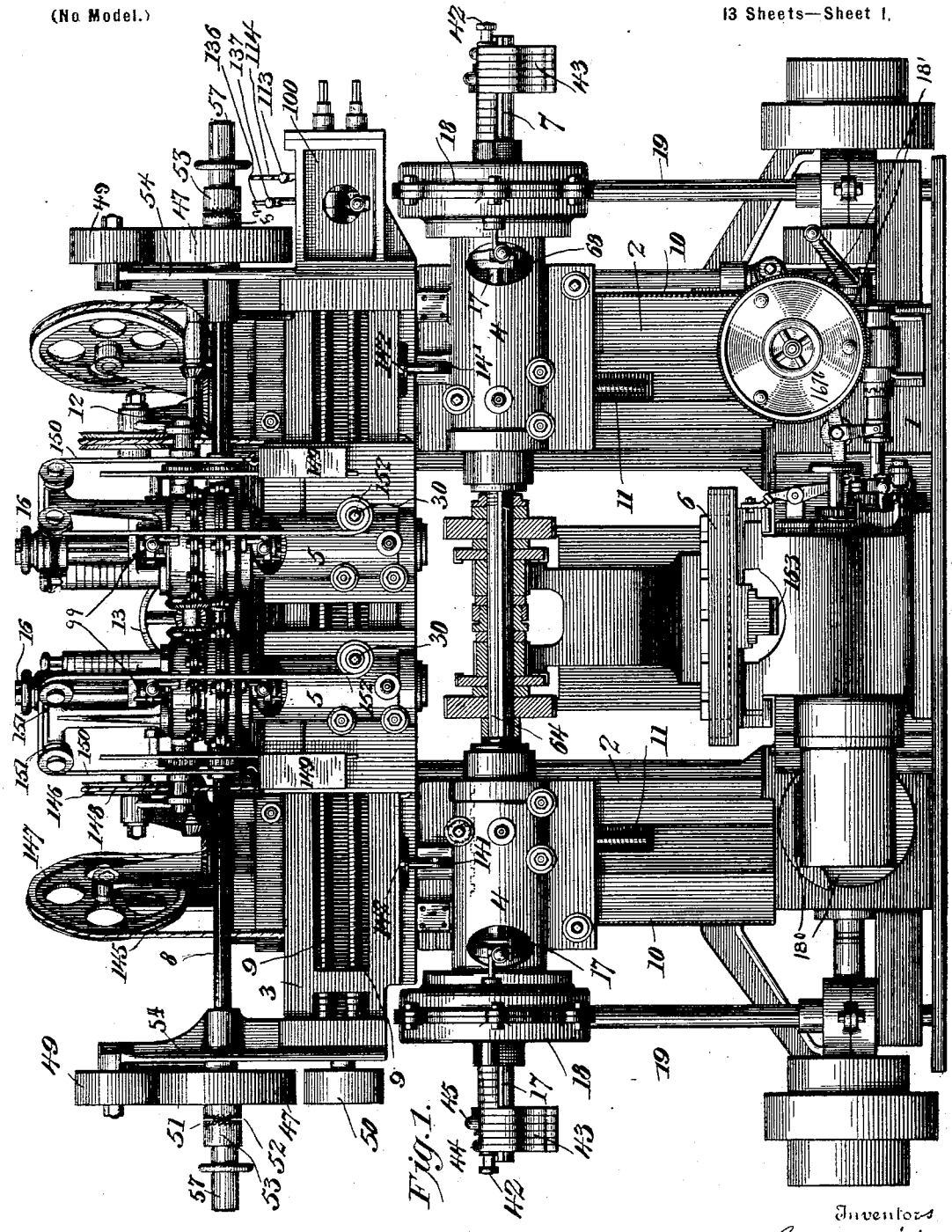

No. 704,134.  
Patented July 8, 1902.

G. W. SMITH & E. J. LEES.
MILLING MACHINE.
(Application filed Sept. 21, 1901.)

(No Model.)  
13 Sheets—Sheet 1.

Witnesses.  
A. B. Williams  
T. H. Buckhead

Inventors  
Geo. W. Smith  
Ernest J. Lees  
By their Attorneys

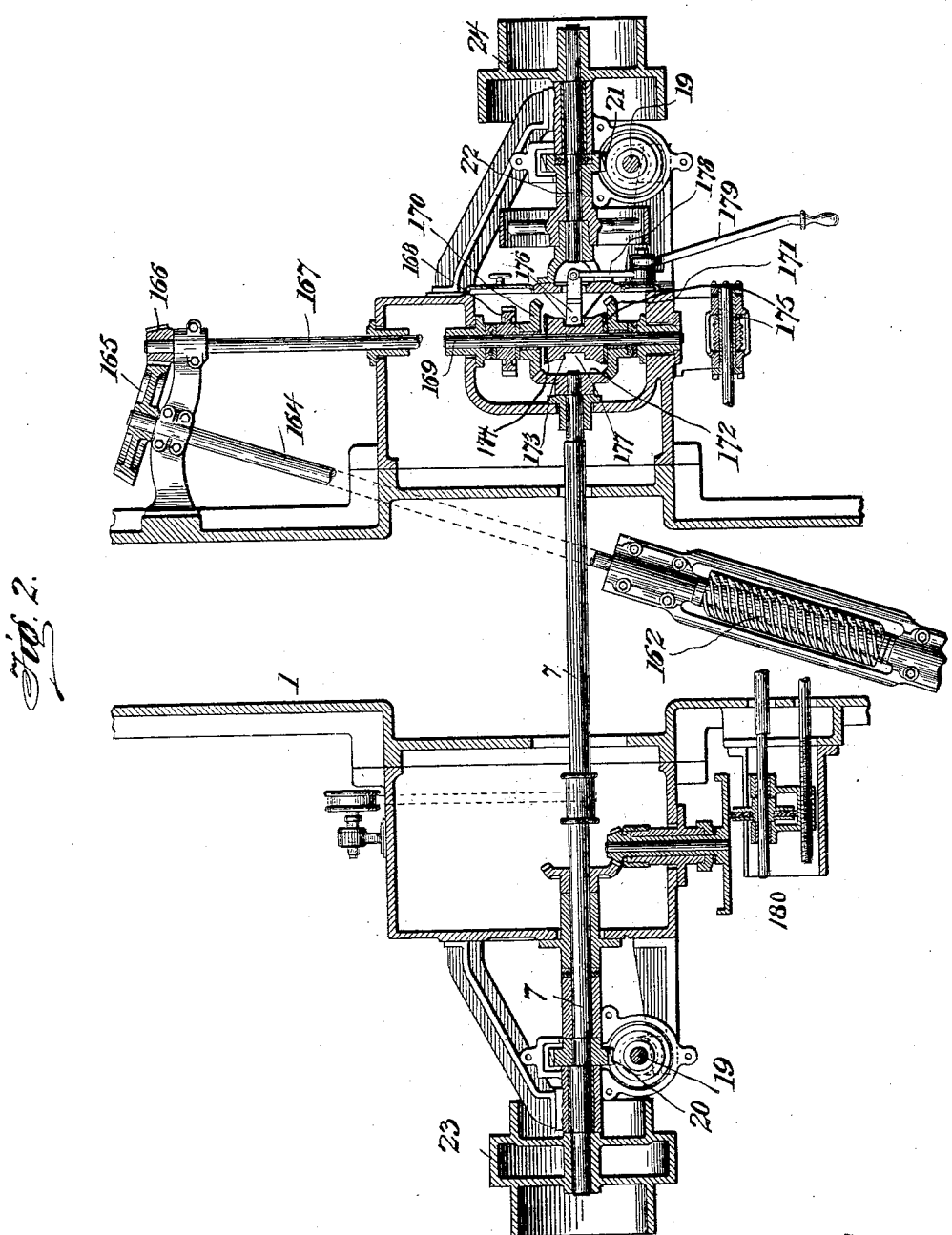

No. 704,134. Patented July 8, 1902.
G. W. SMITH & E. J. LEES.
MILLING MACHINE.
(Application filed Sept 21, 1901.)
(No Model.) 13 Sheets—Sheet 3.
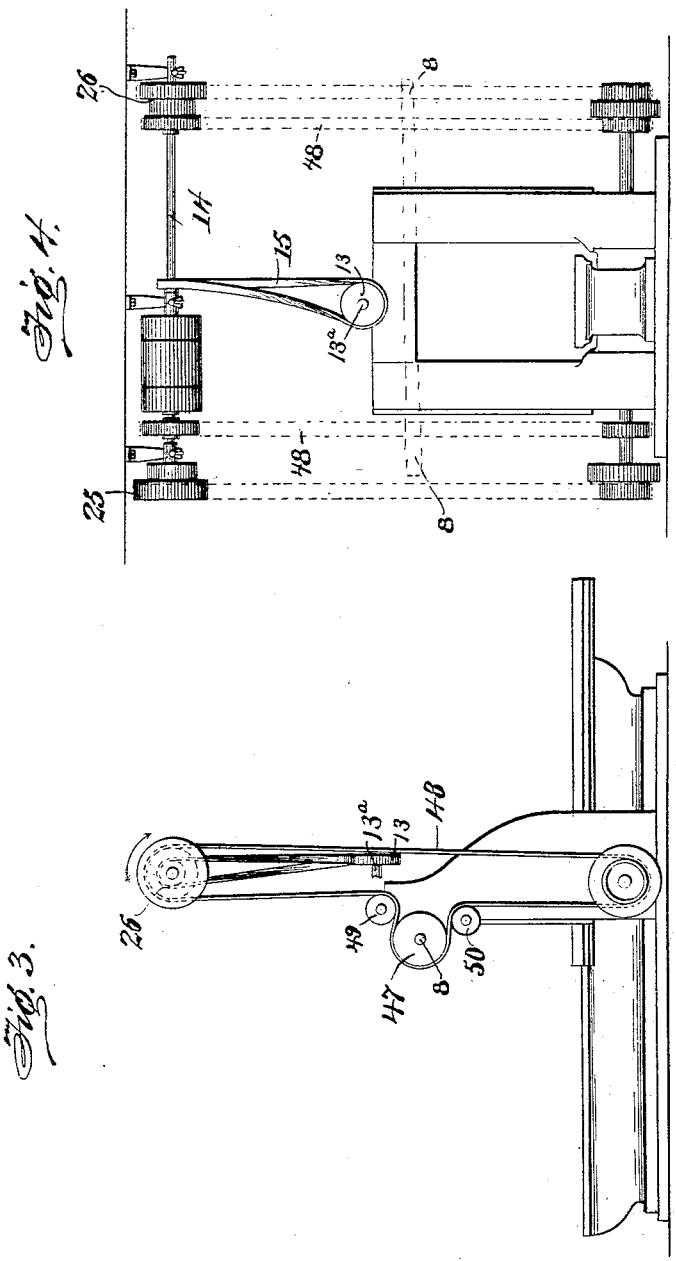

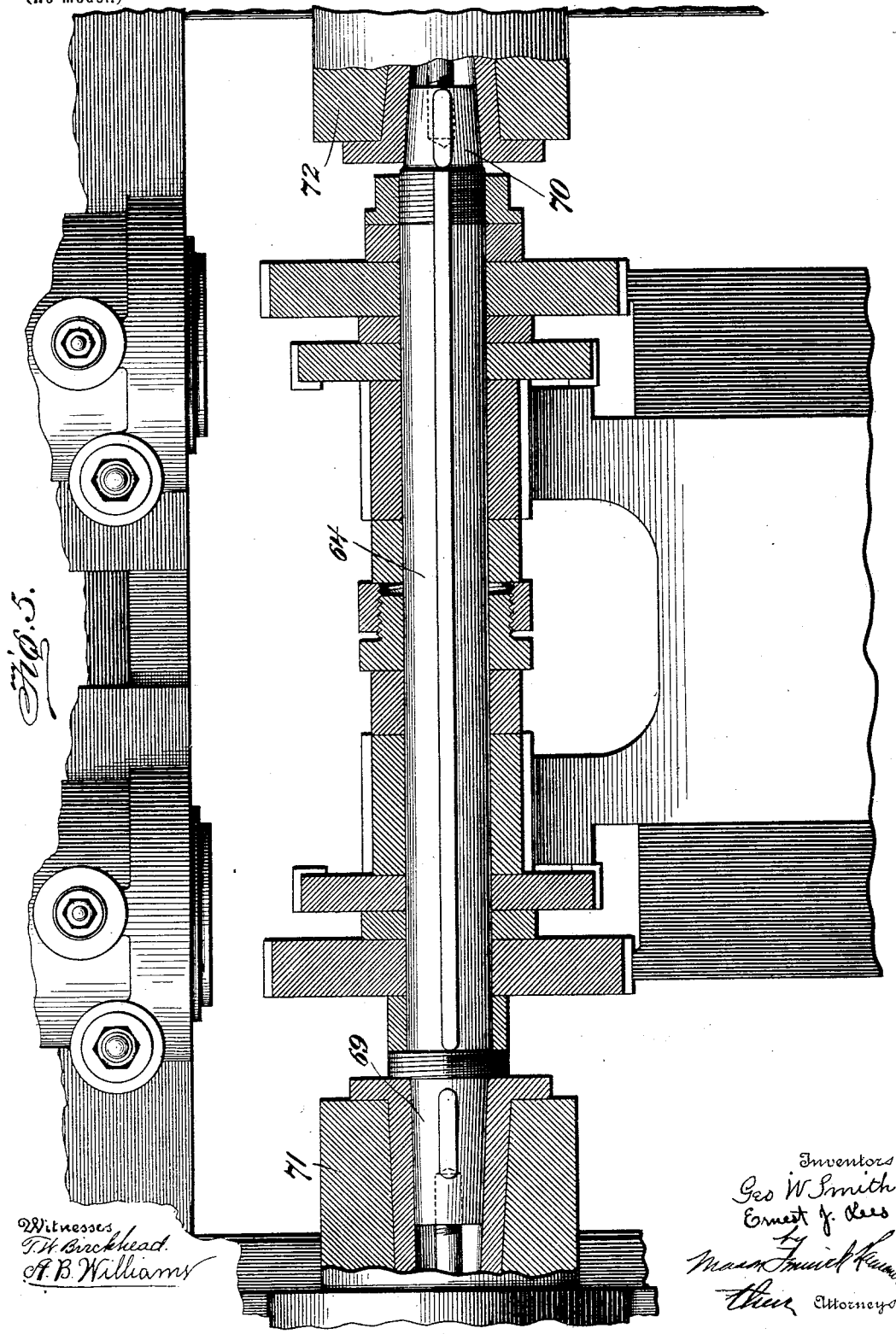

No. 704,134. Patented July 8, 1902.
G. W. SMITH & E. J. LEES.
MILLING MACHINE.
(Application filed Sept. 21, 1901.)
(No Model.) 13 Sheets—Sheet 5.
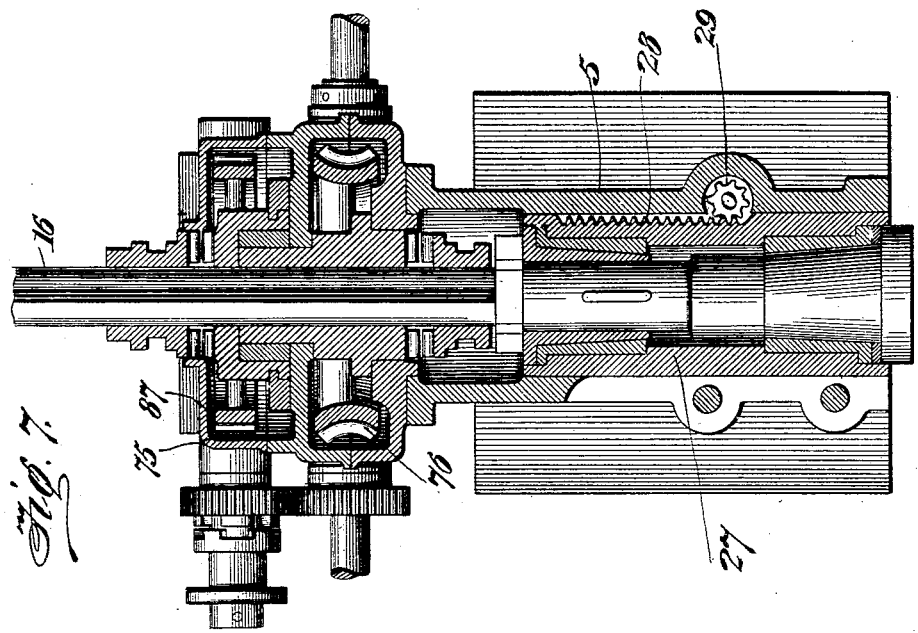
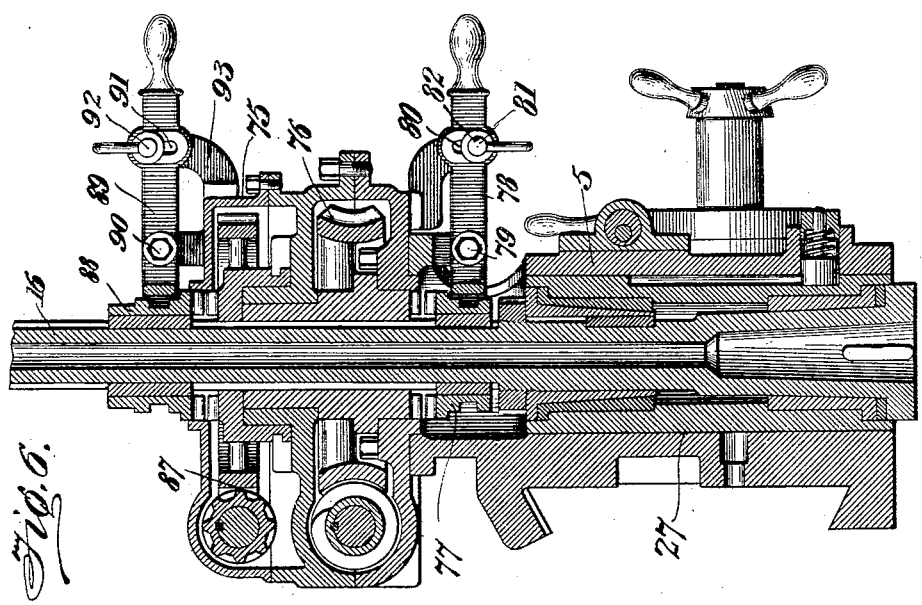
Witnesses
A. B. Williams
T. W. Buckhead
Inventors
Geo W Smith
Ernest J. Lees
By Mason Fenwick Lawrence
Attorneys
THE NORRIS PETERS CO., PHOTO-LITHO., WASHINGTON, D. C.

No. 704,134. Patented July 8, 1902.
G. W. SMITH & E. J. LEES.
MILLING MACHINE.
(Application filed Sept. 21, 1901.)
(No Model.) 13 Sheets—Sheet 6.
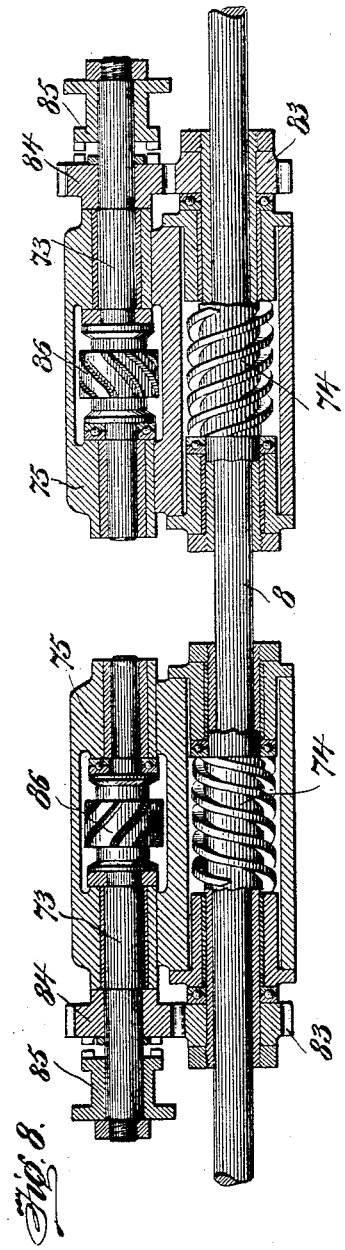
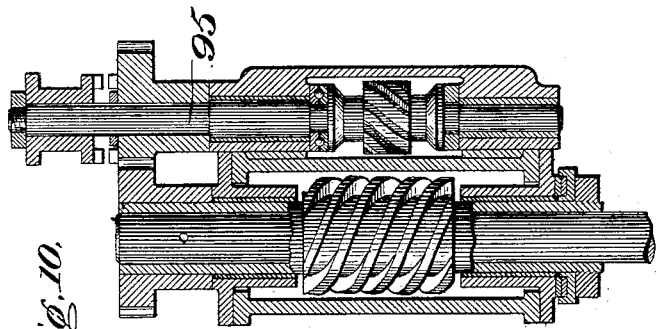
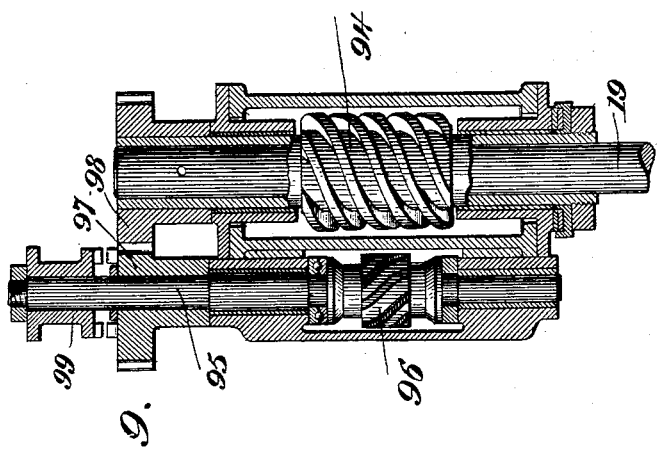

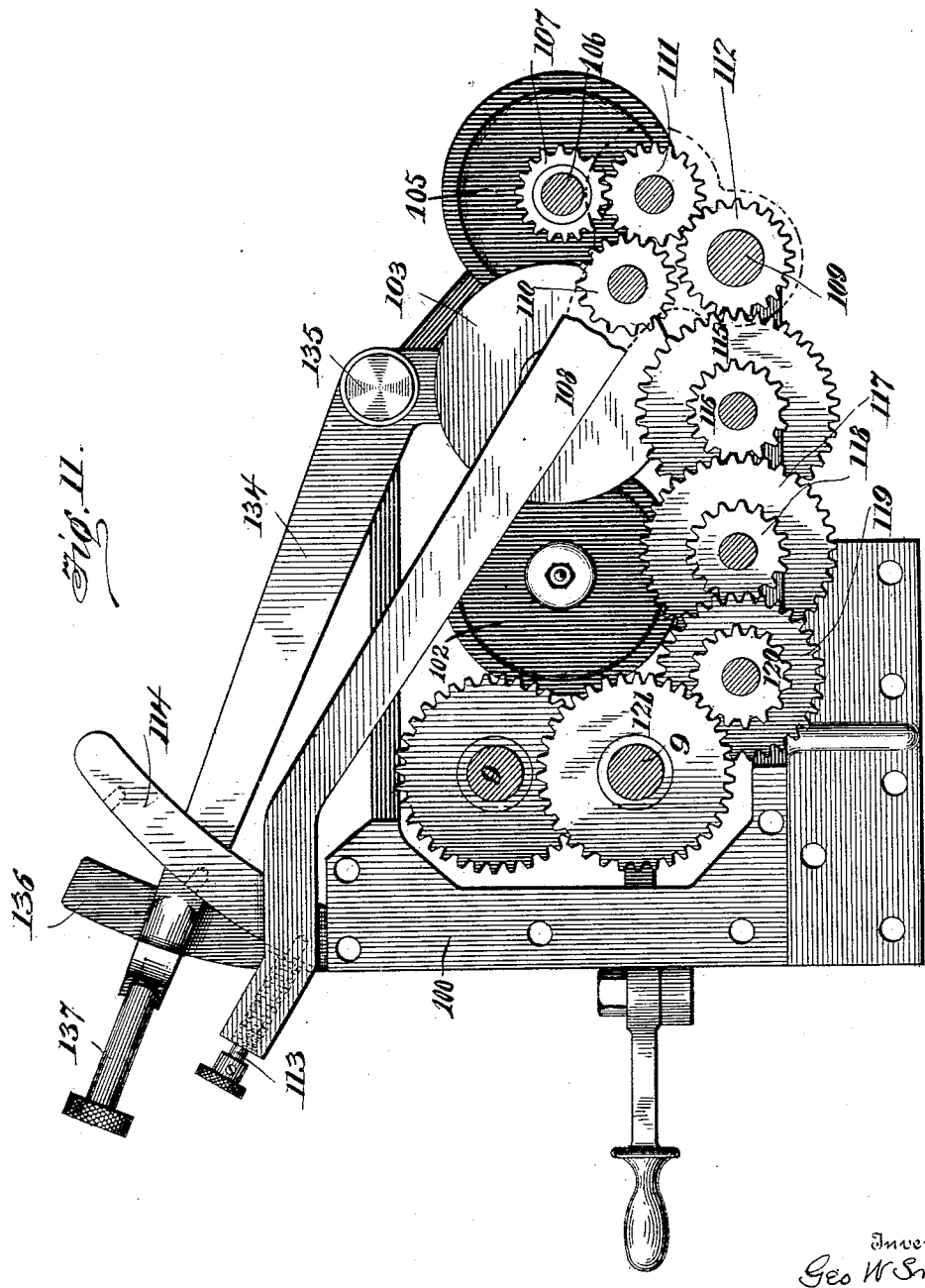

No. 704,134. Patented July 8, 1902.
G. W. SMITH & E. J. LEES.
MILLING MACHINE.
(Application filed Sept. 21, 1901.)
(No Model.) 13 Sheets—Sheet 8.
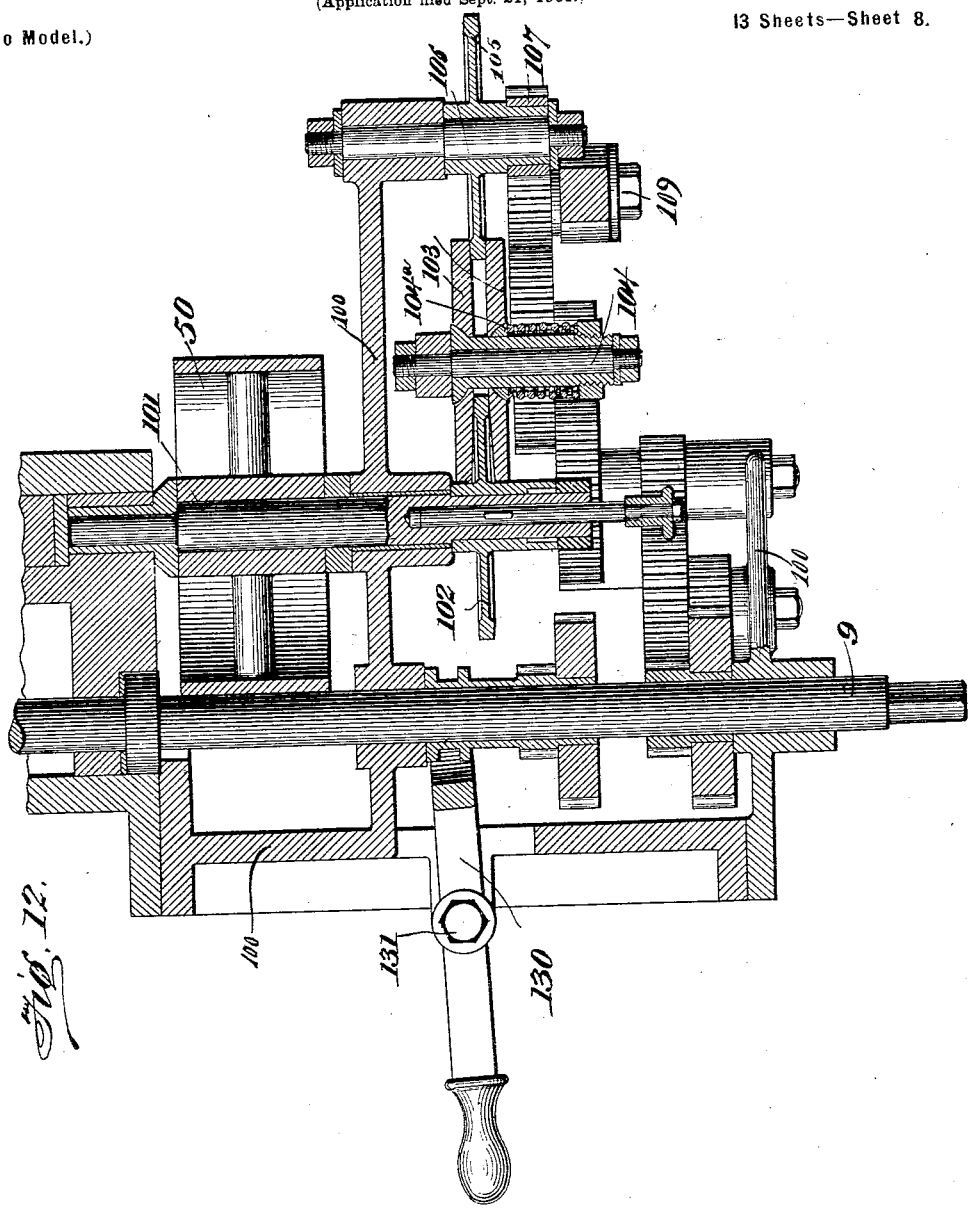

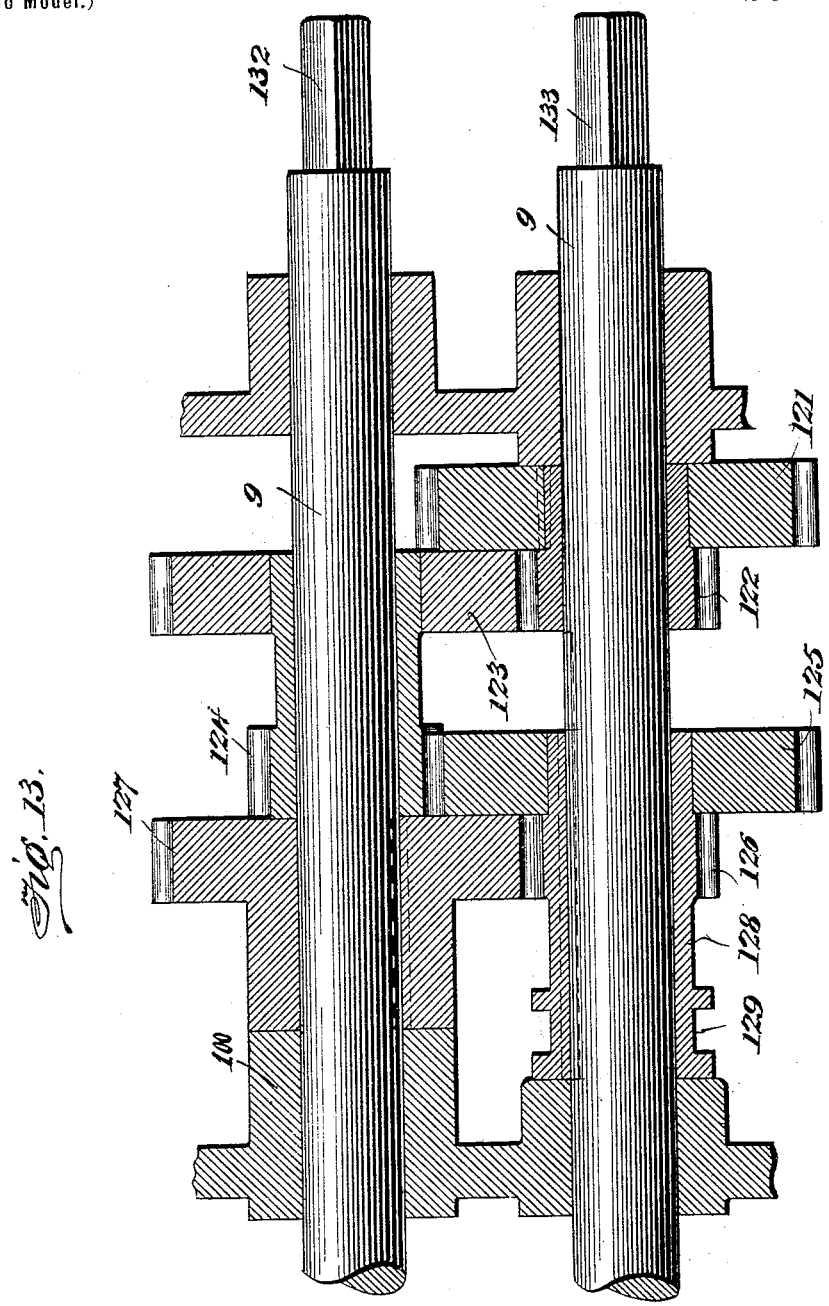

No. 704,134. Patented July 8, 1902.
G. W. SMITH & E. J. LEES.
MILLING MACHINE.
(Application filed Sept. 21, 1901.)
(No Model.) 13 Sheets—Sheet 10.
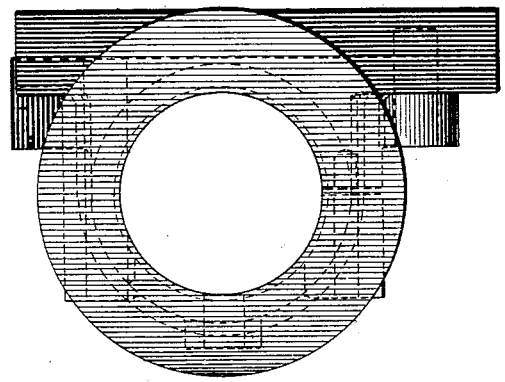
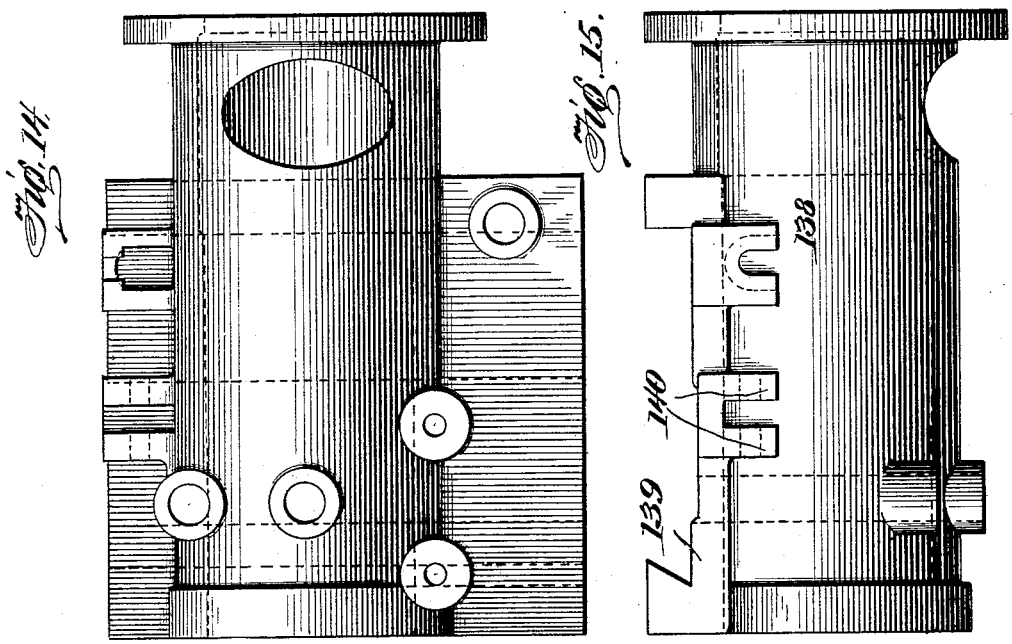

No. 704,134. Patented July 8, 1902.
G. W. SMITH & E. J. LEES.
MILLING MACHINE.
(Application filed Sept. 21, 1901.)
(No Model.) 13 Sheets—Sheet 11.
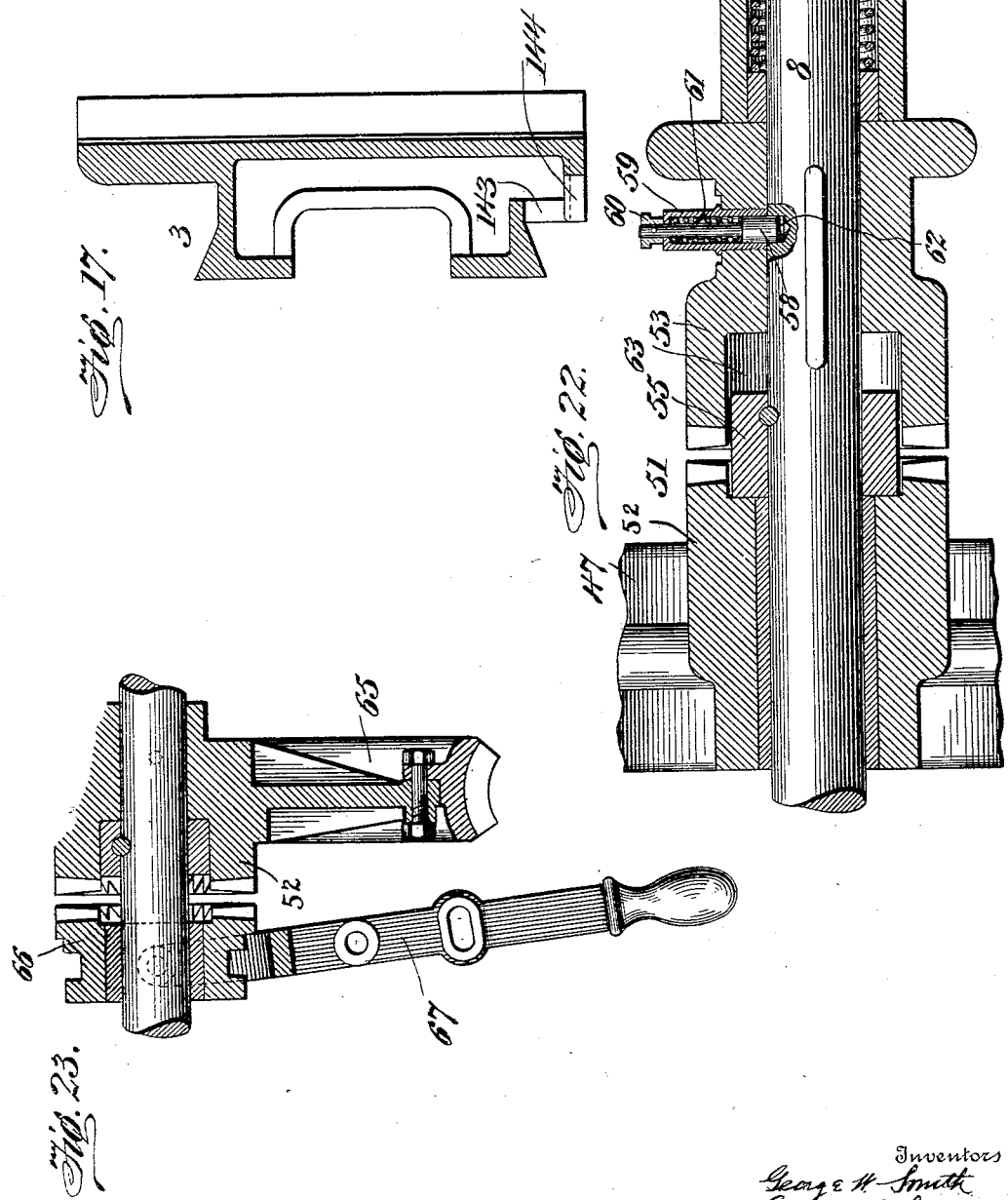

No. 704,134. Patented July 8, 1902.
G. W. SMITH & E. J. LEES.
MILLING MACHINE.
(Application filed Sept. 21, 1901.)
(No Model.) 13 Sheets—Sheet 12.
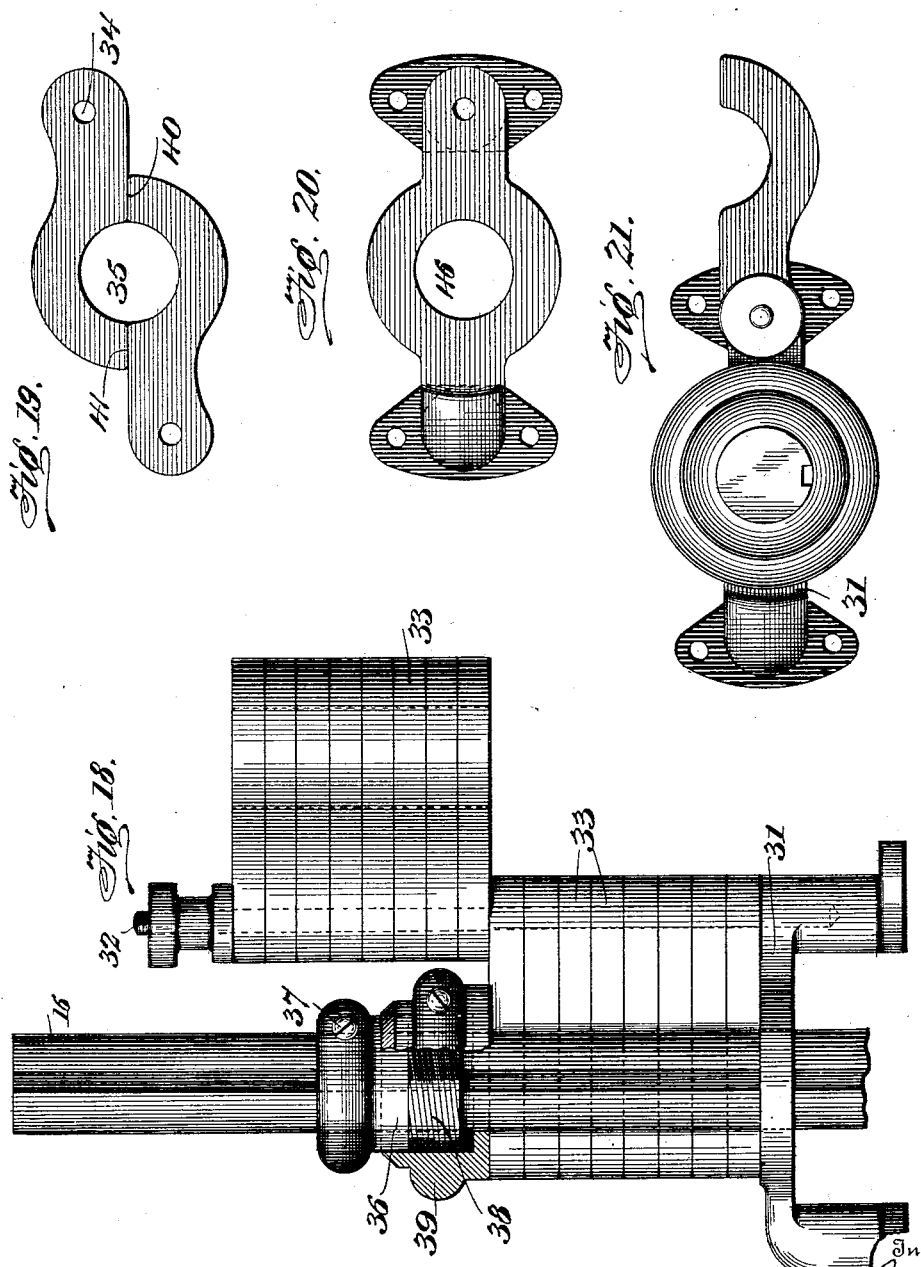

No. 704,134. Patented July 8, 1902.
G. W. SMITH & E. J. LEES.
MILLING MACHINE.
(Application filed Sept. 21, 1901.)
(No Model.) 13 Sheets—Sheet 13.

Witnesses
A. B. Williams
T. W. Birkhead.

Inventors
Geo. W. Smith
Ernest J. Lees
By Mason Fenwick & Lawrence
their Attorneys

UNITED STATES PATENT OFFICE.

GEORGE W. SMITH, OF ROCKFORD, ILLINOIS, AND ERNEST J. LEES, OF FRANKLIN, PENNSYLVANIA, ASSIGNORS TO THE INGERSOLL MILLING MACHINE COMPANY, A CORPORATION OF ILLINOIS.

MILLING-MACHINE.

SPECIFICATION forming part of Letters Patent No. 704,134, dated July 8, 1902.

Application filed September 21, 1901. Serial No. 76,107. (No model.)

*To all whom it may concern:*

Be it known that we, GEORGE W. SMITH, residing at Rockford, in the county of Winnebago and State of Illinois, and ERNEST J. LEES, residing at Franklin, in the county of Venango and State of Pennsylvania, citizens of the United States, have invented certain new and useful Improvements in Milling-Machines; and we do hereby declare the following to be a full, clear, and exact description of the invention, such as will enable others skilled in the art to which it appertains to make and use the same.

The present invention relates to improvements in milling-machines, and particularly to that class of machines which are provided with multiple milling-heads.

The invention has for its object the production of a milling-machine which has one or more vertical milling-heads and one or more horizontal milling-heads, all of which may be operated simultaneously, or the vertical ones by themselves, the horizontal ones by themselves, or a vertical and horizontal one upon one side of the machine and a vertical one and a horizontal one upon the other side of the machine, as may be required for the particular work in hand. The machine is further designed so that the spindles of the milling-heads may be adjusted and gaged as to the extent of their movement, so that pieces of work may be readily and quickly duplicated without the expending of time in readjusting the movement of the spindles. It is further desired to provide such a machine with means by which the vertical spindles may be driven by belts upon each side of the machine, and yet in such a manner that should there be any unevenness in the length of the belts or should the belts stretch unequally the racing of one belt ahead of the other will be compensated for.

It is also the object of the present invention to provide such a machine with suitable reversing mechanism for moving the vertical heads from side to side in the machine, and also to provide the machine with quickly-operated reversing mechanism for feeding the work-table back and forth.

The invention consists in certain novel constructions, combinations, and arrangements of parts, as will be fully set forth in the accompanying description, illustrated in the drawings, and specified in the claims.

Figure 25:
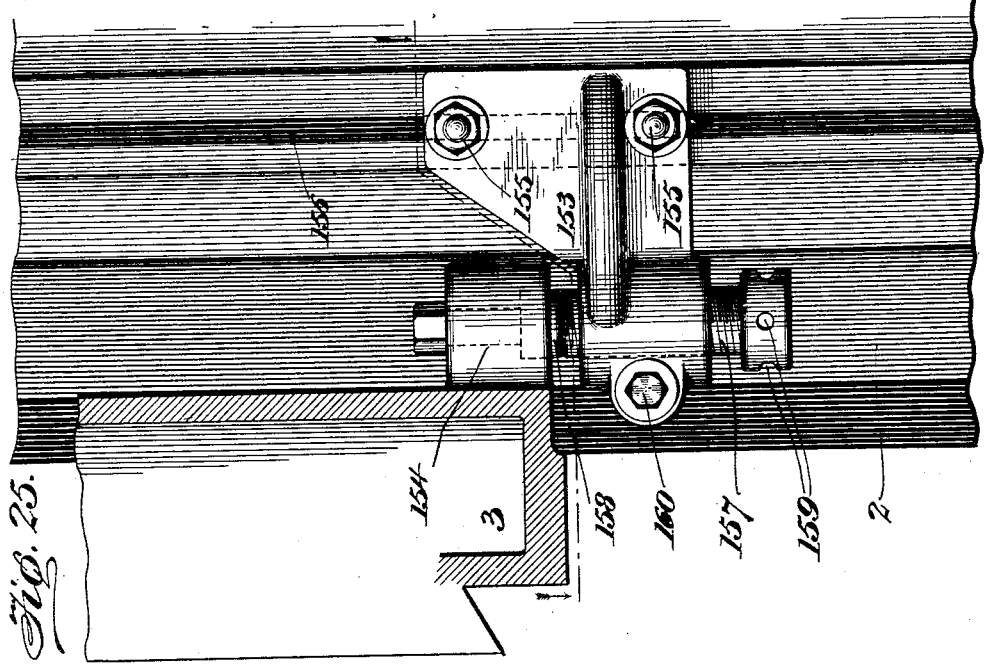
Figure 24:
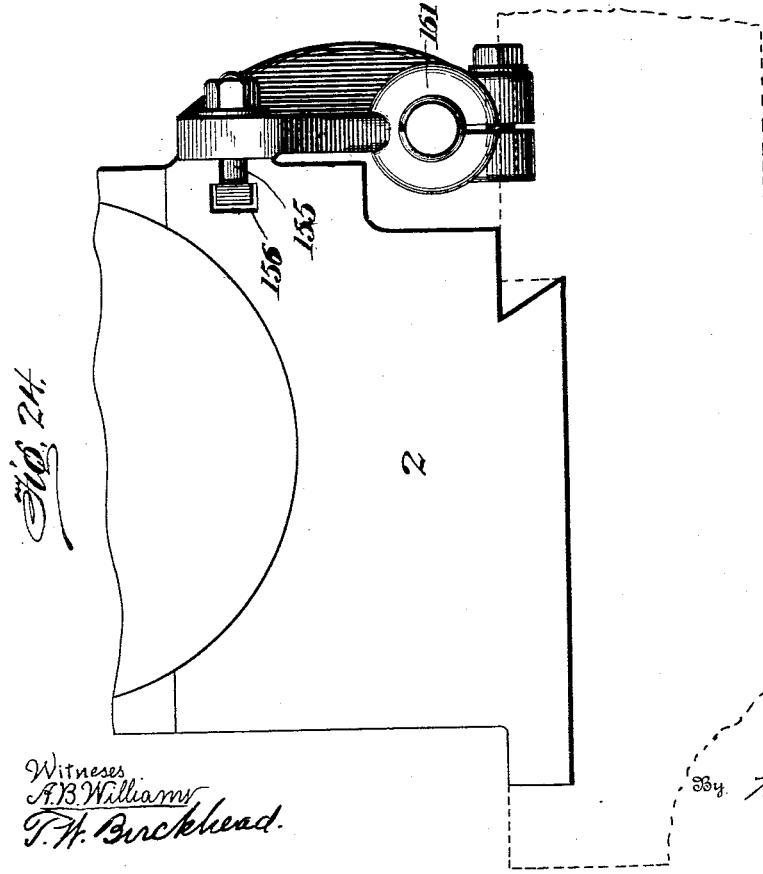

In the accompanying drawings, Figure 1 is the front elevation of a milling-machine embodying our invention. Fig. 2 is a horizontal sectional view through the base of the machine, illustrating the mechanism for reversing the table-feeding device. Fig. 3 is a side elevation of a portion of the machine, showing the arrangement of the side belting. Fig. 4 is a rear elevation of a part of the frame of the machine and showing a counter-shaft mounted above the same and provided with driving cones and pulleys for actuating the milling-machine. Fig. 5 is an enlarged detail sectional view through a horizontal cutter, showing the manner of mounting a horizontal connecting spindle or shaft between the horizontal heads of the machine, adjacent portions of the machine being shown in elevation. Fig. 6 is a vertical central section through one of the vertical spindles and a mechanism for operating the same. Fig. 7 is a vertical central section through the same, taken on a plane at right angles to the plane of the section shown in Fig. 6. Fig. 8 is a vertical central section through the gear-casings, showing the gearing for operating the vertical heads of the machine. Figs. 9 and 10 are vertical central sections through the gear-casings of the horizontal milling-heads, showing the gearing arranged therein. Fig. 11 is an enlarged end elevation of the casing carrying the reversing-gears used for reversing the movement of the vertical milling-heads across the machine. Fig. 12 is a horizontal sectional view through the same. Fig. 13 is a detail sectional view of a portion of the same gearing, showing the means of transmitting motion from one of the cross-shafts to the other. Fig. 14 is a front elevation of the casing of one of the horizontal milling-heads. Fig. 15 is a top plan view of the same. Fig. 16 is an end elevation thereof. Fig. 17 is a vertical cross-section through the cross-rail of the machine. Fig. 18 is an enlarged detail elevation of the upper end of one of the vertical spindles, showing the depth-gage for the same. Fig. 19 is a detail plan view of the blank from which the depth-gage members are produced. Fig. 20 is a top plan view of the standard or base which supports the movable gage members. Fig. 21 is a top plan view of the spindle, showing the relation of the depth-gage members thereto. Fig. 22 is a detail sectional view through one of the compensating clutches upon the cross-shaft which operates the vertical milling-heads. Fig. 23 is a detail sectional view showing a compensating clutch such as is used upon one of the horizontal spindles of the machine. Fig. 24 is a top plan view of one of the stop-gages employed for limiting the downward movement of the cross-rail of the machine. Fig. 25 is a side elevation of the said stop-gage.

In embodying our invention in practical form we provide the milling-machine with a suitable base, as 1, and arrange upon it housings, as 2 2, which extend upwardly upon each side thereof and support the cross-rail 3 of the machine, as well as the horizontal milling-heads 4 4, the vertical milling-heads 5 5 being carried by the said cross-rail 3.

The milling-machine is provided with a suitable traveling table 6 for presenting the work to the milling-heads.

The main power-shaft 7 of the machine is located in the base of the frame 1, and an upper shaft 8 is mounted above the cross-rail parallel with the shaft 7, so as to receive motion therefrom by suitable belting and pulleys, as will be hereinafter more fully described.

The vertical milling-heads 5 5 are capable of a transverse motion in the machine, being moved from side to side therein by means of transversely-arranged horizontal feeding screw-rods 9 9. The casings of the said milling-heads are preferably secured to dovetail-shaped guiding projections formed upon the cross-rail, while the casings of the horizontal milling-heads 4 4 engage similar guiding surfaces or ribs upon the housings 2 2. The horizontal casings can be moved vertically independently of the cross-rail, being provided with gears adapted to engage vertical racks 10 10, secured to the housings 2 2. The cross-rail is adjustable vertically by means of vertical screw-rods 11 11, which are connected by means of vertical gearing at their upper ends with a horizontally-arranged actuating-shaft 12 at the top of the machine. This shaft 12 is rotated by means of suitable gears 12$^a$ and 12$^b$, receiving motion from a pinion 12$^c$, carried by a short shaft 13$^a$ at right angles to said shaft 12, which shaft 13$^a$ receives its motion from a pulley 13, arranged near the central top portion of the machine. The pinion 12$^c$ is moved back and forth between the gears 12$^a$ and 12$^b$, being made to mesh with one or the other, according to the direction in which the shaft 12 is to be turned, for effecting the raising or lowering of the cross-rail. The pulley 13 receives its movement from a counter-shaft 14, arranged above the machine, through the agency of a twisted belt 15, as illustrated in Figs. 3 and 4 of the drawings. By this gearing the screws 11 11 will be rotated simultaneously and will raise both sides of the cross-rail evenly, maintaining the cross-rail always in a horizontal plane. Since the cross-rail supports the vertical milling-heads, they will also be adjusted vertically by this means. The cross-rail 3 also carries the cross-shaft 8, together with the gearing interposed between the same and the vertical spindles 16 16 for revolving the latter. The horizontal spindles 17 17 are of course adjustable up and down with the horizontal milling-heads 4 4 and are actuated by gearing carried in the casings 18 18 on said milling-heads, the said gearing being arranged to connect the horizontal spindles with vertical shafts 19 19. The said gearing has a splined connection with the shafts 19, so that there will be no difficulty in adjusting the milling-heads to different heights upon the housings 2 2. The shaft 19 upon one side of the machine is connected, by means of spiral gearing 20, with the power-shaft 7 and receives its motion therefrom. The shaft 19 on the other side of the machine is connected, by means of spiral gearing 21, with another but shorter power-shaft 22. Both of the power-shafts 7 and 22 are provided with actuating-cones, as 23 and 24, which are so arranged as to be capable of connection by suitable belting with driving-cones 25 and 26 upon the counter-shaft 14, arranged above the machine. The cones upon each side of the machine are preferably made of such sizes that the shafts 7 and 22 may be driven simultaneously at the same speed.

The vertical spindles 16 16 are provided within the casings of the vertical milling-heads 5 5 with supporting-sleeves, as 27 27, which are adjustable vertically within the said casings. Each of the sleeves 27 is formed with a rack 28, which is adapted to be engaged by a pinion 29. The pinion 29 is carried by a shaft 30, which extends outside the casing and is adapted to be turned by any suitable means for raising and lowering the sleeves in the milling-heads. The two spindles 16 16, which are carried by the said sleeves 27 27, are thus capable of vertical adjustment independent of each other and also independent of the vertical adjustment of the cross-rail 3. Suitable bearing-sleeves are interposed between the spindles 16 16 and the said sleeves 27 27 for preventing a longitudinal movement of the said spindles with respect to the sleeves. The spindles are of course capable of rotary movement within the said sleeves. The mechanism which we employ for gaging the depth to which the spindles will work forms an important feature of the present invention. This mechanism is illustrated in Fig. 1 of the drawings and in enlarged detail in Figs. 18, 19, 20, and 21. Adjacent to the spindles 16 16, near their upper ends, and mounted upon the gear-casings carried by the vertical milling-heads 5 5 are supporting-brackets 31 31, which are provided with vertical standards 32 32, upon which are threaded a series of gage blocks or pieces 33 33. The gage-blocks 33 are formed with eyes 34 at their outer ends for revolubly engaging the standards 32, while their main body portions are formed with semicircular recesses 35, so that the said blocks are adapted to fit around the spindles 16 16. The standards 32 32 are arranged sufficiently close to the said spindles to permit of the gage-blocks being swung around against the said spindles 16. The gage-blocks are made of a predetermined thickness, each one being preferably of the same thickness—we will say, for convenience, an inch in depth. Suitable stops are secured to the spindles 16 16 and adapted to engage the gage-blocks, so as to limit the downward movement of the said spindles. These stops preferably consist of collars, as 36 36, which are adapted to be clamped to the spindles 16—as, for instance, by the use of clamping-screws 37 37. Each of the collars 36 is provided for a portion of its length with externally-arranged screw-threads, as 38 38. The screw-threads are adapted to be engaged by internally-arranged threads upon adjusting-collars 39 39. The threads 38 may be so arranged that the adjustable collar 39 is capable of adjustment to the thousandth part of an inch. By the use of these stops and the gage-blocks the depth to which the spindles will be permitted to move can be easily and quickly determined. When, for instance, it is desired to permit the spindle to move downwardly a certain number of inches and a fraction of an inch, the proper number of gage-blocks, each one representing an inch, are thrown against the spindles. By this means the round number of inches is arrived at, and to get the fractional part of the inch it is only necessary to rotate the adjustable collar 39 upon the threads 38 of the clamp-collar 36 to arrive at the result. This device also affords an admirable means for obtaining the same depth of cut upon a number of pieces of work which may be desired exactly alike. In Fig. 19 we have illustrated a convenient and economical way of producing the gage-blocks. The gage-blocks are preferably formed into blanks like that illustrated in Fig. 19, which blank it is only necessary to divide along the lines 40 and 41 to produce a pair of gage-blocks of identically the same size and shape. In Fig. 18 will be seen a number of gage-blocks thrown into engagement with the spindle 16, while at the upper end of the standard 32 a number of the said gage-blocks are swung outwardly away from the said spindle 16. The gage-blocks and stop-clamps are not only applicable to the vertical spindle, but are equally adapted for use upon the horizontal spindles 17 17 for limiting the extent of their inward movement. When used upon the horizontal spindles, the gage-block standards, as 42 42, project horizontally from the casing of the horizontal milling-heads, and the gage-blocks 43 43 are pivoted thereto, so that they may be thrown over into engagement with the spindles 17 17, upon which they will rest in this position. Clamp-collars and adjustable collars 44 and 45, similar to the collars 36 and 39, are provided upon the said spindles 17 17 for obtaining the adjustments to the fraction of an inch. The functions of the parts will be the same as those of the parts secured to the vertical spindles 16 16. It will thus be seen that the horizontal spindles as well as the vertical spindles can be gaged so as to cut to the same depth on duplicate pieces of work. The base 31 is preferably perforated, as at 46, so that it may be slipped over the ends of the spindles, and thereby be arranged in a good position with respect to the same for supporting the gage-blocks when they are swung against the spindles.

Both of the vertical milling-heads 5 5 are arranged so as to have the driving-gears of their spindles driven by the cross-shaft 8. This shaft may be actuated from both sides of the machine and is provided near each end with loose pulleys 47 47, which are arranged in the path of the side belt 48 48 of the machine. The belts also pass around upper and lower idler-pulleys 49 and 50 before passing around the pulleys 47 47, the said idler-pulleys being in a position to hold the belts taut around the loose pulleys 47 47 no matter to what height the cross-shaft 8 may be moved. By reference to Fig. 3 it will be seen that the said driving-belts 48 pass downwardly from the driving-cones upon the counter-shaft 14, beneath the upper idler-pulley 49, and around the front of the loose pulleys 47, thence back of the lower idler-pulleys 50. The belts then pass on downwardly and around the actuating-cones upon the shafts 7 and 22, and thence upwardly again to the cones on the counter-shaft. It will thus be seen that the cross-rail carrying the cross-shaft 8 with its loose pulleys and also carrying the idler-pulleys 49 and 50 can be raised or lowered in the machine without interfering in the least with the revolving of the said loose pulleys 47 of the cross-shaft 8. In order to cause the shaft 8 to be rotated by one or both of the loose pulleys 47, clutches 51 51 are arranged in such relation to the shaft and pulley that the pulleys may be connected with the shaft at any time. One member of each clutch is formed upon the hubs of the loose pulleys 47 47, as at 52, being provided with suitable teeth to engage corresponding teeth formed upon the other clutch members 53 53, which are splined to the shaft 8. The clutch members 53 cannot therefore be turned without moving the shaft 8. They can, however, be moved longitudinally upon the said shaft because of their splined connection therewith. The loose pulleys 47 47, while being free to turn upon the shaft 8, are limited against motion longitudinally thereon by the supporting-frames 54 54 on the cross-rail 3 upon their inner sides and upon their outer sides by collars 55 55, which are secured firmly to the shaft 8 in any suitable manner. The clutch-teeth upon the hubs of the loose pulleys 47 are arranged, as illustrated in Fig. 22 of the drawings, to extend outside the collars 55. The teeth upon the movable clutch members 53 53 are also arranged to project over the said collar 55 55, so that they may be brought into engagement with the teeth upon the hubs of the loose pulleys. The movable clutch members 53 53 are normally forced toward the loose pulleys by springs 56 56, which are seated in small housings or casings 57, secured to the ends of the shaft 8. The loose members 53 53 are provided with means, however, by which they may be held out of engagement with the clutch-teeth of loose pulleys when it is not desirable to run the shaft 8. This means preferably consists of a plunger 58, mounted in a casing 59 which is secured in an aperture formed in each of the clutch members 53. The rod of the said plunger 58 projects outwardly through the end of the casing 59, where it is provided with an operating knob or head 60. A coil-spring 61 is arranged within each casing 59, so as to force the plungers 58 against the shaft 8. When the member 53 is retracted against the action of the spring 56, the plunger 58 will be forced into an aperture 62, formed in the shaft 8. When the plunger 58 is thus permitted to snap into the aperture 62, the clutch member 53 will be held out of engagement with the loose pulley. The clutch members 53 are formed with recesses 63 in their inner ends sufficiently large to more than accommodate the collars 55 when the clutch members are brought together. The great utility of the arrangement of the clutches is the capability of driving the milling-heads upon one side of the machine without the necessity of driving the milling-heads upon the other side of the machine and the possibility of driving the vertical milling-heads from either side of the machine, as may be desired. It is found in practice that the shaft 8 and the vertical milling-heads may be driven to advantage from both sides of the machine, any slight unevenness of the belts at each side of the machine being compensated for by the clutches just described. Whenever either of the belts begins to race ahead of the other the movable clutch member 53 of the lagging belt will slip—say one or two teeth—being instantly forced back into engagement again by spring 56, the shaft going ahead of the lagging pulley momentarily. In this manner any slight unevenness in the belts will be quickly and automatically adjusted and no trouble will be experienced in endeavoring to run the said shaft 8 from belts upon each side of the machine. If it should be desired to run the said shaft by only one of the said belts, the clutch member 53 at the other end of the shaft can be retracted until its plunger 58 engages the recess 62, when the pulley 47 on that side of the machine will cease to actuate, said shaft 8 merely running freely thereon. If it is not desired to operate the vertical heads for a time—say when the horizontal milling-heads alone are acting upon the work in the machine—both clutch members 53 may be retracted and the shaft 8 thus be permitted to rest. This will also prevent wear and tear upon the gearing for actuating the vertical spindles. It is desirable also, we find, to provide the horizontal spindles 17 17 with clutches similar to those upon shaft 8, especially when both spindles are connected by a single spindle 64 for supporting horizontal cutters between the same when working upon certain class of work. In this instance the clutches are formed with one member upon the hubs of the worm-wheels 65 65, which form a part of the gearing connecting the said shafts 19 19 with the said horizontal spindles 17 17. The other members 66 66 of the said clutches are splined to the spindles 17 17, so that they may move longitudinally thereon; but when actuated in a rotary manner they will revolve the said spindles. The members of the clutches are formed with engaging teeth similar to those upon the clutches 51 51. The clutch members 66 66 in this instance are preferably not forced against the clutch members upon the gear-wheels 65, but are positively moved by means of operating-levers 67 67. These levers 67 project through apertures 68, formed in the casings of the milling-heads 4 4, and are provided upon their outer ends with handles arranged within easy reach of the operators of the machine. The lever may, if desired, be provided with any suitable means for clamping it in its different positions. By the use of these clutches the spindles 17 17 may be connected with the actuating-gearing at any time independently of each other, and one spindle may be permitted to remain idle while the other is working or both spindles may remain idle when the vertical spindles alone are being used. When both the spindles 17 17 are connected by the intermediate spindle 64, these clutches will operate to allow for any unevenness in the transmitting-gearing for actuating the two spindles upon each side of the machine in a similar manner to the operation of the clutches 51 51. With these clutches, however, when one of the members 66 is forced away from its corresponding clutch member on the gear 65 it must be moved back into engagement therewith by hand through the operation of its lever 67.

In operating upon work where only horizontal cutters can be used it is often very desirable to connect the two spindles 17 17, so that they will work in unison. Such a connecting-spindle, as 64, is illustrated in an enlarged form in Fig. 5 of the drawings. This spindle, it will be seen, is tapered at its ends 69 and 70. The desired milling heads or cutters are properly secured in position upon this intermediate spindle 64, and the tapered ends 69 and 70 are then splined in position in the ends of the horizontal spindle-sleeves 71 and 72, and the spindles are firmly secured thereto. By this structure the two spindles 17 17 become as one shaft for the time being.

In operating the vertical spindles 16 16 we preferably provide them with two sets of gears, whereby they may be given different speeds. One set of gears is connected directly with the cross-shaft 8, while the other set of gears is connected with a counter-shaft 73, which when in use is actuated by shaft 8, opposite each of the vertical milling-heads. These gears may be of any suitable kind; but we find it advantageous to employ one kind of gearing—say worm-gearing—for the direct connection with the shaft 8 and some other kind of gearing—say spiral gearing—with the indirect connections through the counter-shafts 73 73. As illustrated in Figs. 6, 7, and 8 of the drawings, we secure to the shaft 8 the worms 74 74, inclosed within suitable casings 75 75 upon the upper ends of the milling-heads 5 5. These worms engage worm-wheels 76 76, which run loosely upon the spindles 16 16. When it is desired to rotate the spindles 16 16, they are connected with the worm-wheels 76 76 by means of suitable clutches 77 77, which are splined to the spindles and which are moved by operating-handles 78 78, pivoted at 79 upon the milling-heads. These levers 78 may be provided with elongated slots 80, which are engaged by clamping screws or bolts 81, which are held in position by brackets secured to the casings 75 75. Clamping-nuts 82 82 engage the ends of these screws 81, so that after the levers 78 have been moved to the desired position they may be firmly held there by the clamping-nuts 82. In order to actuate the counter-shafts 73 73, spur-gears are arranged upon the shaft 8, as at 83 83, which mesh with corresponding spur-gears 84 84, loosely mounted upon the shafts 73. The spur-gears 84 84 are adapted to be engaged by clutches 85 85, which are splined to the shafts 73, so that the said shafts may be caused to revolve through the agency of the intermeshing gears 83 and 84. The said counter-shafts 73 73 can, however, be permitted to remain idle by disengaging the clutches 85 85 from the spur-gears 84. Each of the counter-shafts 73 is provided with a spiral gear 86, which is arranged so as to mesh with a spiral gear 87 upon each of the spindles 16. The gears 87 run loosely upon the spindles 16, but are adapted to be connected therewith by means of clutches 88, splined upon the said spindles. These clutches are operated by levers 89, pivoted to the casings 75, and are adapted to be clamped in their adjusted positions in a similar manner to the levers 78, being provided for this purpose with elongated slots 91, which are engaged by clamping-screws 92 upon brackets 93. It will thus be seen that by the proper disposition of the clutches the spindles may be caused to rotate at one speed through the agency of the worms 74 and the worm-gears 76, or they may be operated at another speed through the agency of the spiral gears 86 and 87, the clutches 88 and 85 being in their closed positions, while the clutches 77 are thrown out of engagement. Of course it will be apparent that the worm-gears and the spiral gears might be transposed, one being substituted for the other, or it will be evident that other kind of gears might be employed, as desired. It will also be seen that a clutch member might be interposed between the gears 76 and 87 for actuating the spindles through either train of gears, the said clutch being a double clutch and capable of movement in one direction to engage the gear 76 and in the other direction to engage the gear 87.

The mechanism interposed between the shafts 19 19 and the horizontal spindles 17 17 may be of a similar character to that just described with respect to the vertical spindles. Thus, as illustrated in Figs. 9 and 10, the shafts 19 may be provided with worms 94, adapted to engage worm-wheels upon the spindles. Counter-shafts 95 95 may also be employed for engaging the said spindles by means of spiral gears 96, which mesh with spiral gears upon said spindles. The counter-shafts 95 95 receive their motion from the shafts 19 19 through intermeshing spur-gears 97 and 98. The gear 97 runs loosely upon the shaft 95, but is adapted to be connected therewith by a clutch 99. In this manner the horizontal spindles, as well as the vertical spindles, may be given different speeds, all within the control of the operator of the machine.

The vertical spindles, as heretofore stated, are arranged in casings which are capable of a transverse movement across the machine upon ways formed on the cross-rail 3, their movement across the said rail being controlled by the longitudinal feeding screw-rods 9 9. The means by which these screw-rods may be simultaneously rotated and may be turned in one way or reversed forms a feature of the invention. The screw-rods 9 9 at one side of the machine project beyond the housings thereof and pass through a gear-casing 100. This gear-casing 100 is so constructed as to provide bearings for all of the intermediate gears and short shafts necessary for making up the intermediate gearing interposed between the two screw-rods 9 9. We preferably drive the gearing for actuating the said rods 9 9 by means of the lower idler-pulley 50 upon one side of the machine. This idler-pulley 50 is secured to a shaft 101, (see Fig. 12,) mounted in the casing 100, the outer end of the shaft carrying a feed-disk 102. This feed-disk projects between and actuates a pair of feeding-disks 103 103, mounted upon a short arbor 104 in the said casing. These feed-disks 103 103 are pressed toward each other by a spring 104$^a$. These disks transmit motion through a feed-disk 105, which also extends between them and which runs upon an arbor 106, secured to the casing 100. Upon the hub of the disk 105 is secured a pinion 107, which is adapted to drive the reversible train of gearing, which will now be described. A reversing-lever 108 is pivoted to a stud or shaft 109, secured to the casing 100, and carries two intermeshing gears 110 and 111. These gears 110 and 111 revolve upon studs on the said lever 108, the said studs being arranged at different distances from the axis of the arbor 109. The gear 111 may thus be arranged so as to always mesh with a gear 112, loosely mounted on the arbor 109. When the lever 108 is in its lowest position, the gear 111 may be brought into mesh with the pinion 107, so that the said pinion will communicate motion to the gear 112 directly through the gear 111. This will serve to turn the gear 112 in one direction. In order to reverse this gear, the lever 108 is raised to its highest position, which will move the pinion 111 out of engagement with the pinion 107 and will bring the gear 110 into engagement with said pinion 107. The motion will now be imparted from the pinion 107 through the gear 110 and the gear 111 in a reverse direction to the gear 112, the said gear 111 having been moved out of engagement with the pinion 107 at the same time that the gear 110 was brought into engagement with said pinion 107. By moving the lever 108 to an intermediate point between the extreme movements just described both gears 110 and 111 may be separated from the pinion 107 for disconnecting the threaded rods from the power-drive received through the pulley 50. The lever 108 is provided at its outer end with a spring-pressed pin 113, which is adapted to engage notches or recesses formed in a rack-bar 114. The notches or recesses in this rack are so arranged that the latch-pin 113 will lock the lever in its raised or lowered position or at the intermediate point, as may be desired. The gear 112 transmits motion to a gear 121 upon the lower feed-screw 9 through a train of intermediate gears 115, 116, 117, 118, 119, and 120, mounted upon suitable shafts or arbors secured in place in the casing 100. The gears 116, 118, and 120 are rigidly secured, respectively, to the gears 115, 117, and 119. The gear 121 runs loosely with respect to the lower rod 9 and is carried upon the hub of a pinion 122, which meshes with a gear 123, running loosely upon the upper feed-rod 9. This pinion 123 is provided with an elongated hub carrying a pinion 124 at its inner end, which meshes with a gear 125, mounted on the lower feed-rod 9. The gear 125 is also secured to an elongated hub of a pinion 126, which engages and operates a gear 127, rigidly secured to the upper feed-rod 9. The elongated hub 128 of the gear 126 is splined to the lower feed-rod, so as to revolve therewith, while being capable of a longitudinal movement thereon. This elongated hub 128 is also provided with an annular groove 129, adapted to be engaged by the bifurcated end of a shifting lever 130. The shifting lever 130 extends through an aperture in the casing 100, being pivoted to the said casing at 131. The outer end of the said shifting lever 130 can be easily reached for moving the gears 125 and 126 back and forth upon the lower feed-rod 9. It will be readily seen that by moving the shifting lever 130 the gears 125 and 126 can be disconnected—that is, moved to one side—so as to be out of engagement with the gears 124 and 127. Thus the power received through the train of gearing connected with the idler-pulley 50 will be at once disconnected from the upper as well as the lower feed-rod 9. This can be done at any time, and it is sometimes quite desirable to do so, so that the feed-rods can be turned independently of each other. For this purpose each of the said rods is squared at its outer end, as at 132 133, so that by applying a suitable handle to the squared ends of either of the rods it may be turned independently of the other. The speed with which the gearing just described is actuated may be regulated by moving the feed-disks 103 103 between the two feed-disks 102 and 105. The arbor 104, which carries the disks 103, is mounted upon the end of a lever 134, which is pivoted at 135 to the casing 100. The outer end of this lever also engages a graduated rack-bar 136 and is provided with a set-screw 137, so that it may be clamped in any position upon the said rack-bar. By adjusting this lever the speed communicated from the disk 102 to the disk 105 can be controlled to a nicety.

It is often desirable to so connect the horizontal milling-heads with the cross-rail 3 that they may be raised or lowered in the machine by one mechanism—namely, the vertical screws 11. The casings of the horizontal milling-heads 4 4 are constructed as illustrated in Figs. 14, 15, and 16. These casings are also well shown in Fig. 1, though upon a smaller scale. They consist each of a hollow cylindrical casing 138, provided with a base-plate 139, adapted to dovetail upon the guiding-ways formed upon the cross-rail 3. Upon the upper edges of the base-plates 139 are formed lugs 140, between which are pivotally secured bolts 141 141, formed with eyes in their lower ends for engaging the pivot-pins, which hold them in place and having threads upon their upper ends for engaging nuts 142 142. When the bolts 141 141 are swung downwardly upon their pivot-pins, the horizontal milling-heads will be disconnected from the cross-rail 3; but when it is desired to connect the said milling-heads with the cross-rail they are brought together and the bolts 141 are turned upwardly until the nuts at their upper ends extend into a slot 143 at each end of the rail 3. Slots 144 in the bottom of said rail receive the bolts 141. The nuts 142 may then be turned upon the ends of the bolts, so as to draw the milling-heads tightly against the bottom of the cross-rail. In this way when the cross-rail is raised or lowered the milling-heads 4 4 will be carried with it. This is usually a desirable way of moving the said milling-heads when the vertical milling-heads are not being used and is especially convenient when the said horizontal milling-heads are linked together by the intermediate spindle 64 and it is necessary to raise and lower both heads equally and simultaneously. To facilitate the movement of the milling-heads and the cross-rail upon the frame of the machine, the heads and the said rail are connected with counterbalance-weights by means of cords or ropes 145 and 146, which are connected to the said parts at one end and pass upwardly and over pulleys 147 and 148 and thence downwardly again to the counterweights. The vertical spindles 16 16 and the sleeves that carry them are also preferably counterbalanced by means of weights 149, secured to cords 150, which pass over supporting-pulleys 151 151 and thence downwardly to drums 152 upon the shafts of the pinions 29, which are used for raising and lowering the said sleeves and spindles.

In a machine of this character it is often desirable to limit the downward movement of the cross-rail 3 at a certain predetermined point. For this purpose we employ adjustable cross-rail stops comprising adjustable members 153, which are adapted to be secured at different heights upon the housings 2, and members 154, fastened to the cross-rail 3. The member 153 is provided with two or more headed bolts 155 155, which engage with their heads vertically-arranged grooves 156, formed in the inner faces of the housings 2. Nuts upon the outer ends of these bolts serve to draw the parts together and clamp the said member 153 at the desired point. This mechanism is sufficient for an approximate adjustment of the stop member; but in order to obtain a very accurate adjustment we provide the members 153 with adjusting-screws 157, which project upwardly, so as to come in contact with the head of a bolt 158, embedded in and secured to each of the members 154. The lower end of each of the screws 157 may be provided with a head having laterally-arranged apertures 159 therein, so that the said screw may be turned by inserting a pin or other lever in the holes successively. After the screws 157 have been adjusted properly they are clamped in position by a screw-bolt 160 in each of the members 153, which is arranged to draw together the divided jaws of the sockets 161, which surround the adjusting-screws 157 157. In arranging the limit of the downward movement of the cross-rail 3 the nuts on the bolts 155 are loosened, and the members 153 are slid along the grooves 156 until they are approximately in the desired position, when the bolts 155 are again tightened to clamp the members in place. The screws 157 are next turned to produce a very fine and accurate adjustment of the parts. In lowering the cutters carried by the cross-rail 3 they can be lowered again and again to exactly the same depth for duplicating pieces of work by the use of these simple cross-rail stops.

The work-table 6, which moves back and forth upon the base of the frame 1, is preferably reciprocated by means of a worm 162, which is arranged beneath the said work-table and engages a longitudinally-arranged rack 163, secured to the under side thereof. The worm 162 is secured to a diagonally-arranged shaft 164, which finds suitable bearings in the base-frame and carries at its outer end a beveled gear 165. This gear is engaged by a beveled pinion 166, carried by a shaft 167. The shaft 167 preferably lies parallel with the line of movement of the work-table and is connected by spur-gearing, as at 168, with a counter-shaft 169, arranged immediately above the said shaft 167. Upon this counter-shaft 169 is arranged a series of gears by which the work-table may be fed forward in the machine by power and may be reversed quickly and moved back again. The gearing mentioned comprises two facing beveled gears 170 and 171, which ordinarily run loosely upon the shaft 169. These beveled gears both engage an intermediate beveled gear 172, which is secured to one end of the shaft 7. Both the gears 170 and 171 will thus be continually revolved by the intermediate gear 172, but in opposite directions. Interposed between the gears 170 and 171 is a reciprocating double clutch 173, which is adapted to be brought against the inner faces of each of the gears 170 and 171. The double clutch 172 is splined to the shaft 169, so as to revolve therewith, and friction-washers, preferably of leather, as 174 and 175, are interposed between the ends of the said double clutch and the said gears. It will follow, therefore, that when the double clutch is moved against the gear 170 the shaft 169 will be turned in one direction for feeding the table one way, and when the said clutch is reversed and brought into contact with the gear 171 the said shaft 169 will be turned in the opposite direction and the table will be reversed. For moving the double clutch back and forth a lever 176 is pivoted to the frame and engages an annular groove 177, formed around the said double clutch. The outer end of the lever 176 is connected, by means of a link 178, with a bell-crank-lever 179, which is pivoted upon the frame 1. By raising or lowering the outer end of the said lever 179 the double clutch may be moved back and forth and the movement of the table regulated. By this structure power can be used for feeding the table back and forth, the table can be quickly reversed, and can be moved to a very slight degree or to its fullest extent, as may be required.

The mechanism just described sets forth a means for quickly feeding the table in either direction; but of course for the purposes of milling a comparatively slow feed is employed, usually at the rate of two or three inches of movement per minute, the usual friction-feed, as 180, being employed for this purpose. This friction-feed is adjustable by means of mechanism on the right-hand side of the machine and operates the feed-shaft 167 through the medium of the worm-wheel 181 in any well-known manner.

From the above description it will be evident that our invention produces a machine which is most perfect and complete for milling purposes and one which is admirably adapted for dressing work with all kinds of vertical and horizontal milling-cutters. It will be seen that all the milling-heads may be operating cutters simultaneously upon the same piece of work and that when desired any one or more of the milling-heads may be allowed to rest while others are used. Thus one or both of the vertical heads may be used, one or more of the horizontal heads may be used simultaneously, and a vertical and a horizontal head may be used at the same time upon one side of the machine, while those upon the other side of the machine are idle. It will also be evident that the vertical milling-heads can both be driven by a single belt upon either side of the machine, or two belts, one upon each side of the machine, may be used for this purpose. It will also appear that the parts are all capable of simple and quick adjustment, the said adjustments also being made with great accuracy.

Having now described our invention, what we claim as new, and desire to secure by Letters Patent, is—

1. In a milling-machine, the combination with a suitable frame, of adjustable vertical milling-heads mounted thereon, and adjustable horizontal milling-heads also on said frame, cutters carried by all of said heads, means for communicating a rotary motion to the said cutters no matter what the adjusted position of the milling-heads, means for adjusting the vertical heads simultaneously or separately toward or away from each other, and means for operating all of the said cutters simultaneously or any one or more of them without the others, substantially as described.

2. In a milling-machine, the combination with a frame, a plurality of horizontal milling-heads, and a plurality of vertical milling-heads, and means for adjusting the said milling-heads vertically and horizontally irrespective of each other, of means for operating any one of the milling-heads separately or in conjunction with any other milling-head, the operation of any of the milling-heads either separately or conjointly not interfering with the operation of others, substantially as described.

3. A milling-machine, comprising a suitable frame, and housings, a plurality of vertical milling-heads adjustably mounted in said frame, means for adjusting them simultaneously or separately in either direction, a shaft common to said milling-heads, and means connecting the shaft with each milling-head for driving rotary cutters at different rates of speed, and changing from one speed to another, substantially as described.

4. A milling-machine comprising a suitable frame, a vertically-adjustable cross-rail movable upon the said framing, vertical milling-heads adjustably mounted on the said cross-rail, spindles carried by said heads, a shaft carried by the said cross-rail for actuating the vertical milling-spindles, means for driving the said shaft from either or both ends thereof comprising loose pulleys mounted thereon, clutch members on the said shaft for engaging the said pulleys, and belts engaging each of the said loose pulleys and receiving their power from any suitable source, together with idler-pulleys also carried by the said cross-rail for maintaining the belt taut no matter what the position of the cross-rail, the said clutches making it possible to connect the belt-wheels with the said shaft at one or both ends thereof as found desirable for actuating the shaft from either end or from both ends, substantially as described.

5. A milling-machine comprising a suitable housing or framing, vertical milling-heads mounted thereon, spindles carried by said heads, a shaft for operating them, means for driving the said shaft from either or both ends, comprising belt-engaging pulleys loosely mounted on said shaft, the hubs of said pulleys being formed with clutch-engaging teeth, spring-pressed clutch members splined upon the said shaft and having teeth for engaging the teeth upon the said pulleys, and spring-controlled plungers or detents carried by the said clutch members for engaging recesses formed in the shaft, so that the clutch members may be held out of engagement when desired, and when the shaft is being driven by belts on both sides of the machine any unevenness in the length of the belts will be compensated by the slipping of one or the other of the clutch members, substantially as described.

6. A milling-machine comprising a frame, milling-heads mounted thereon, cutter-actuating spindles carried by the said milling-heads, depth-gages applied to the said spindles comprising a series of gage-blocks adapted to be swung against the spindles separately or together, clamp-collars secured to the spindles and adjusting-collars engaging the clamp-collars, the depth to which the cutters will be operated being quickly and accurately gaged, substantially as described.

7. In a milling-machine the combination with suitable cutter-operating spindles, depth-gages for the said spindles comprising a series of gage-blocks, a standard near each spindle for pivotally supporting the said gage-blocks, the said gage-blocks being formed with concaved recesses so that they may fit closely around the spindles, a clamp-collar secured to each spindle, an adjustable collar engaging threads upon each of the clamp-collars, the gage-blocks being made of predetermined thickness and the adjustable collars being movable so as to secure fractional parts of said thickness, the depth to which the spindles will be permitted to operate being regulated to the thousandth part of an inch, substantially as described.

8. In a milling-machine the combination with vertical and horizontal cutter-spindles of depth-gages, arranged at their outer ends for regulating the depth of the cuts, comprising standards or bases secured to the frame of the machine and surrounding the said spindles, standards or rods projecting therefrom, a series of gage-blocks pivoted to the said standard so that they may be swung against or away from the said spindles, the said gage-blocks being made of a predetermined thickness and formed with concaved recesses so that they may fit around the spindles, clamp-collars fastened to the spindles, and adjustable collars engaging screw-threads upon the said clamp-collars adjustments to the fraction of an inch being thus obtained, the said adjusting gage-blocks affording means for obtaining quickly approximate adjustments to the proper depth, substantially as described.

9. A milling-machine comprising adjustable milling-heads, cutters carried thereby, and a frame for supporting the same, spindles for carrying the milling-cutters arranged horizontally in the said milling-heads, means for adjusting said spindles toward or away from each other, means for rotating the said spindles, an intermediate spindle for connecting the said horizontal spindles, so that when horizontal cutters are being employed they may be actuated simultaneously from both sides of the machine by the said horizontal spindles thus connected, substantially as described.

10. A milling-machine comprising a suitable housing upon the frame of the machine, horizontal milling-heads movable thereon, spindles mounted in the said milling-heads, gearing for rotating the said spindles, clutches for connecting the spindles with the said gearing, the said clutches being splined upon the said spindles so as to rotate therewith and yet capable of longitudinal movement thereon, levers for moving the said clutches to bring them into engagement with the said gearing, an intermediate connecting-spindle for joining the said horizontal spindles, the said intermediate spindle having tapered ends adapted to be keyed in the ends of the horizontal spindles so as to make practically one shaft of them, the arrangement of the clutches being such that the said spindles and shaft may be driven from either one or both sides of the machine, the levers affording means for bringing the clutches again into engagement with the gearing when they have been thus thrown out of such engagement, substantially as described.

11. A milling-machine comprising a suitable frame, a cross-rail adjustable thereon carrying vertical milling-heads, horizontal milling-heads movable on said frame, means for adjusting the cross-rail vertically on the frame and separate means for adjusting the horizontal milling-heads vertically on the frame and means for connecting the horizontal milling-heads with the cross-rail so that they may be adjusted simultaneously by one of said adjusting means, substantially as described.

12. A milling-machine comprising a suitable frame, a cross-rail carrying milling-heads mounted thereon, means for adjusting the said cross-rail vertically in the frame of the machine, horizontal milling-heads also vertically adjustable upon said frame by independent means, means for securing the horizontal heads to the cross-rail comprising bolts pivoted at their lower ends to the said horizontal heads, nuts engaging threads upon the said bolts, the said cross-rail having slotted recesses formed in its lower edge for receiving the said bolts and nuts, so that by connecting the said horizontal milling-heads with the cross-rail they may be moved simultaneously therewith and will be held exactly opposite to each other during the said movement, substantially as described.

13. A milling-machine, comprising a suitable framing, vertical milling-heads mounted thereon, spindles for carrying milling-cutters mounted therein, a plurality of trains of gearing adapted to be connected with said cutters for rotating them, and mechanism for connecting the cutters directly with one of said trains of gearing or indirectly therewith through the other train of gearing, so that the cutters may be revolved at different speeds by changing the gearing, substantially as described.

14. In a milling-machine the combination with a suitable frame of an adjustable cross-rail, vertical milling-heads adjustably mounted thereon so that they may be moved to different positions in the machine, one or more trains of gearing connected with a source of power and adapted to be connected with the spindles of the said milling-heads for imparting a rotary motion thereto, a plurality of shafts carrying said gearing, the adjustment of the cross-rail and of the milling-heads to different positions on the machine not interfering in the least with the operation of the said gears, and means for bringing the gears into engagement with one shaft directly or indirectly through the agency of the other shaft, or throwing them out of engagement therewith when they are not being used, substantially as described.

15. In a milling-machine, the combination with a suitable frame of an adjustable cross-rail, movable milling-heads mounted thereon, a shaft common to a plurality of the said milling-heads, counter-shafts adjacent to said common shaft, gearing connecting the counter-shafts with the common shaft, the common shaft being adapted to operate the milling-heads directly through some of the gearing or indirectly through other gearing of the said counter-shafts, cutter-actuating spindles in the milling-heads having gears adapted to engage the gearing upon the said shafts, and clutches for throwing the said gears into or out of engagement with the said spindles, substantially as described.

16. In a milling-machine, the combination with a frame of vertical milling-heads adjustably mounted thereon, an actuating-shaft arranged across the machine so that it may be caused to actuate the milling-heads, cutter-carrying spindles in each of the milling-heads, upper and lower gears loosely mounted on the said spindles, clutches for connecting the gears with the said spindles, gearing upon the said cross-shaft for engaging one set of gears on the spindles, a counter-shaft mounted in suitable proximity to the cross-shaft, gearing for transmitting motion from the cross-shaft to the counter-shafts, and gears upon the counter-shaft for engaging the other set of gears upon the spindles, and clutches for controlling the said gears, either set of gears being used to drive the spindles, so that different speeds may be imparted to the same according to the train of gears which is selected, substantially as described.

17. In a milling-machine the combination with a suitable frame of laterally-adjustable vertical milling-heads mounted thereon, a cross-shaft supported in the machine so as to actuate each of the said milling-heads, counter-shafts adjacent to said cross-shaft and geared thereto, two trains of gearing connecting the spindles of the milling-heads with the cross-shaft and counter-shafts, and means for throwing either train of gearing into engagement for driving the spindles directly by the cross-shaft or indirectly through the counter-shafts, substantially as described.

18. In a milling-machine the combination with a suitable frame of laterally-adjustable vertical milling-heads mounted thereon, cutter-carrying spindles mounted in each milling-head, a cross-shaft for actuating the said milling-heads, two trains of gearing for connecting the said cross-shaft with the said spindles, one comprising worm-gears directly connecting the said spindles with the said shaft, and the other comprising counter-shafts, gearing for connecting the counter-shafts with the cross-shaft, and spiral gearing connecting the counter-shaft with the said vertical spindles, clutches for throwing either the worm-gearing or the spiral gearing into engagement with the spindles, and clutches for connecting the counter-shafts with the gearing interposed between them and the said cross-shaft, substantially as described.

19. In a milling-machine the combination with a suitable frame of vertical milling-heads adjustably mounted thereon, spindles mounted in the said milling-heads, upper and lower gears loosely mounted thereon, splined clutches for connecting each gear to the spindle, levers for operating the said clutches, gears upon the cross-shaft for engaging the lower gears on the spindles, counter-shafts arranged above the cross-shaft, gearing connecting the counter-shafts and cross-shaft, clutches for throwing the gearing into and out of engagement with the said counter-shafts, and gearing connecting the counter-shafts with the upper gears upon the spindles, either the upper or the lower train of gearing being employed for actuating the spindles according to the speed with which it is desired to operate the same, substantially as described.

20. In a milling-machine the combination with a suitable frame of vertical milling-heads mounted thereon, means for raising and lowering the milling-heads, cutter-actuating spindles mounted in each of the milling-heads, means for raising or lowering either of the spindles independently of each other in the milling-heads, and independently of the milling-head adjustments, comprising sleeves supporting the said spindles, and vertically movable in the milling-heads, racks upon the said sleeves, and pinions for engaging the said racks, gearing splined to the upper portion of the said spindles, and means for throwing the said gearing into and out of engagement with the spindles, the spindles being adjusted vertically without interfering with their connection with the driving-gearing, substantially as described.

21. In a milling-machine the combination with a suitable frame of a cross-rail mounted thereon, means for raising or lowering the said rail on the said frame, vertical milling-heads adjustably mounted upon the said cross-rail, whereby they may be moved laterally to different points in the machine, vertical spindles mounted in the milling-heads, a cross-shaft carried by the cross-rail and arranged so as to be common to both the milling-heads, gearing interposed between the said cross-shaft and the said vertical spindles, the said gearing being some of it splined to the cross-shaft and some of it splined to the vertical spindles, suitable casings for holding the gearing in place with respect to the milling-heads, the milling-heads being adjusted up or down in the machine or laterally without interfering with the actuating-gearing, substantially as described.

22. In a milling-machine the combination with a suitable frame of vertical milling-heads mounted thereon, vertical spindles mounted in each milling-head, a cross-shaft mounted upon the machine so that it may be employed or actuated in said milling-heads, casings mounted upon the said milling-heads so as to surround a portion of the said shaft as well as a portion of each of the said spindles, counter-shafts carried in each of the said casings, spur-gears connecting the counter-shafts with the said cross-shaft, an actuating-gear upon the cross-shaft opposite each spindle, an actuating-gear upon each counter-shaft opposite each spindle, gears upon the spindles meshing with the gears upon the cross-shaft and counter-shafts, and clutches for controlling all of the said gears, the counter-shaft transmitting either motion directly to the spindles or indirectly through the counter-shafts for varying the speed with which the spindles are driven, substantially as described.

23. In a milling-machine the combination with a suitable frame of horizontal milling-heads mounted thereon, horizontal spindles carried thereby, vertical actuating-shafts arranged in suitable proximity to the said spindles, and gearing connecting the vertical shafts with the spindles, some of the said gearing being splined to the vertical shafts and some of the said gearing being splined to the said spindles, clutch mechanisms for connecting or disconnecting the parts, and means for raising or lowering the milling-heads on the frame, and means for adjusting the horizontal spindles in and out in the milling-heads, the splined engagement of the gears with the said shafts and with the said spindles permitting of such adjustment, substantially as described.

24. In a milling-machine the combination with the main frame of horizontal milling-heads mounted thereon, and adapted to be vertically adjusted, horizontal spindles carried by the said milling-heads, vertical shafts for driving the spindles, casings carried by the milling-heads and inclosing portions of the vertical shafts and portions of the said spindles, counter-shafts mounted in the said casings and connected by gearing with the said vertical shafts, a train of gearing connecting each vertical shaft with each spindle, and gearing connecting each counter-shaft with each spindle, and clutches controlling the said gearing, the horizontal spindles being driven directly from the vertical shafts at one speed and indirectly through the counter-shafts at another speed, substantially as described.

25. In a milling-machine the combination with a supporting-frame of vertical and horizontal milling-heads mounted thereon, spindles carried by each of the milling-heads, means for adjusting the vertical milling-heads vertically in the machine and means for adjusting them longitudinally, means for adjusting the spindles in said vertical heads independently of each other in a vertical manner, comprising racks, sleeves carrying the said racks and holding the said spindles, and pinions for actuating the said racks, means for adjusting the horizontal milling-heads vertically in the machine, means for adjusting the horizontal spindles back and forth in their respective heads independently of each other, comprising racks formed upon sleeves and attached to the spindles, and pinions for engaging the same, substantially as described.

26. In a milling-machine the combination with a supporting-frame of laterally-adjustable vertical milling-heads mounted thereon, feed screw-rods for moving the said milling-heads back and forth, adjustable gearing interposed between the said rods, means for controlling the said gearing whereby the feed-rods may be connected thereby or disconnected, a pulley for actuating the gearing, a shaft carrying the same, speed-controlling friction feed-disks connected with the said shaft, reversible gears for receiving motion from the said feed-disks, and a train of gears for connecting the said reversible gears with the gears of the feed-rods, both rods being driven simultaneously by power in either direction or by hand separately and independently of each other, substantially as described.

27. In a milling-machine the combination with a supporting-frame of laterally-adjustable vertical milling-heads mounted thereon, feed-rods for moving the milling-heads back and forth on the machine, gearing connecting the feed-rods, an idler-pulley mounted in the frame in suitable proximity to said gearing and adapted to engage one of the driving-belts of the machine, speed-controlling feed-disks for receiving motion from the shaft of the said pulley, a lever for operating the said disks, reversible gears receiving motion from the said feed-disks, a lever for operating the said reversible gears, a train of gearing connecting the reversible gears with the gearing upon the feed-rods, and a casing formed with bearings for supporting the arbors and shafts of all the said gears, substantially as described.

28. In a milling-machine the combination with a supporting-frame of laterally-adjustable vertical milling-heads mounted thereon, a cross-rail for supporting them, means for raising or lowering the cross-rail, and depth-gages for limiting their downward movement comprising adjustable members secured to the vertical housings of the machine on both sides thereof, and a fixed member secured to the cross-rail opposite each of the adjustable members, an adjusting-screw carried by the said adjustable members and adapted to be engaged by the fixed members, the said stops being very accurately adjusted by means of said screws for permitting the cross-rail to descend the same depth a number of times, substantially as described.

29. In a milling-machine the combination with a supporting-frame of a cross-rail mounted thereon, and carrying milling-heads, a depth-gage for controlling the depth to which the cross-rail may be lowered in the machine comprising a movable member secured to each side of the machine, bolts engaging vertically-arranged grooves in the housings of the machine for holding the movable members in their different adjusted positions, an adjusting-screw carried by each movable member, a clamp-screw for clamping the said adjustable screw when they have been arranged at the desired height, a fixed member secured to the cross-rail opposite each adjustable member, a bolt arranged in each fixed member so that its head forms a contact or bearing surface for engaging the end of the adjusting-screw held by its corresponding movable member, and means for adjusting the said adjusting-screws, substantially as described.

In testimony whereof we hereunto affix our signatures in presence of two witnesses.

GEORGE W. SMITH.
ERNEST J. LEES.

Witnesses as to the signature of George W. Smith:
R. K. WELSH,
W. E. STEVENS.

Witnesses as to the signature of Ernest J. Lees:
FRED. D. OILER,
H. H. PRIME.